US009842125B2

(12) United States Patent
Adelman

(10) Patent No.: US 9,842,125 B2
(45) Date of Patent: Dec. 12, 2017

(54) NESTED MEDIA CONTAINER, PANEL AND ORGANIZER

(71) Applicant: ATLYS, INC., South Jordan, UT (US)

(72) Inventor: Charles Nathan Adelman, Thousand Oaks, CA (US)

(73) Assignee: ATLYS, INC., South Jordan, UT (US)

( * ) Notice: Subject to any disclaimer, the term of this patent is extended or adjusted under 35 U.S.C. 154(b) by 572 days.

(21) Appl. No.: 14/259,623

(22) Filed: Apr. 23, 2014

(65) Prior Publication Data

US 2015/0310043 A1 Oct. 29, 2015
US 2016/0306826 A9 Oct. 20, 2016

Related U.S. Application Data

(60) Provisional application No. 61/815,331, filed on Apr. 24, 2013.

(51) Int. Cl.
G06F 17/30 (2006.01)
G06Q 30/02 (2012.01)
H04L 29/06 (2006.01)

(52) U.S. Cl.
CPC .... *G06F 17/30289* (2013.01); *G06F 17/3015* (2013.01); *G06F 17/30292* (2013.01); *G06F 17/30312* (2013.01); *G06Q 30/0242* (2013.01); *G06Q 30/0264* (2013.01); *H04L 63/0428* (2013.01); *H04L 63/0861* (2013.01); *H04L 2463/082* (2013.01)

(58) Field of Classification Search
CPC ......... G06F 17/30233; G06F 17/30292; G06F 17/30312
USPC .......................................................... 707/822
See application file for complete search history.

(56) References Cited

U.S. PATENT DOCUMENTS

2007/0018997 A1* 1/2007 Edwards ................. A63F 13/00
345/605
2011/0099494 A1* 4/2011 Yan ....................... G06T 11/206
715/765

* cited by examiner

Primary Examiner — Sheree Brown
(74) Attorney, Agent, or Firm — Stoel Rives LLP

(57) ABSTRACT

A method for the organizing, managing, mapping, distributing, transportation and displaying of multi-layered content and/or data in a tactile volumetric (three-dimensional), flat (two-dimensional) and/or multi-dimensional container and/or panel which functions as a macro controller through tactile, sensatory, audible and/or other forms of user control. This includes the means to manipulate content and/or data through a visual and/or multi-sensatory interface that stores content and media in a nested and sub-nested hierarchical container and sub-container array which can give real-time feedback to any involved party. These containers and/or panels provide a means to permanently move and validate content between servers, devices and/or users, while giving a real-time visual and/or multi-sensatory response and representation to that user. This system also provides a means to ingest and convert legacy media formats.

18 Claims, 21 Drawing Sheets

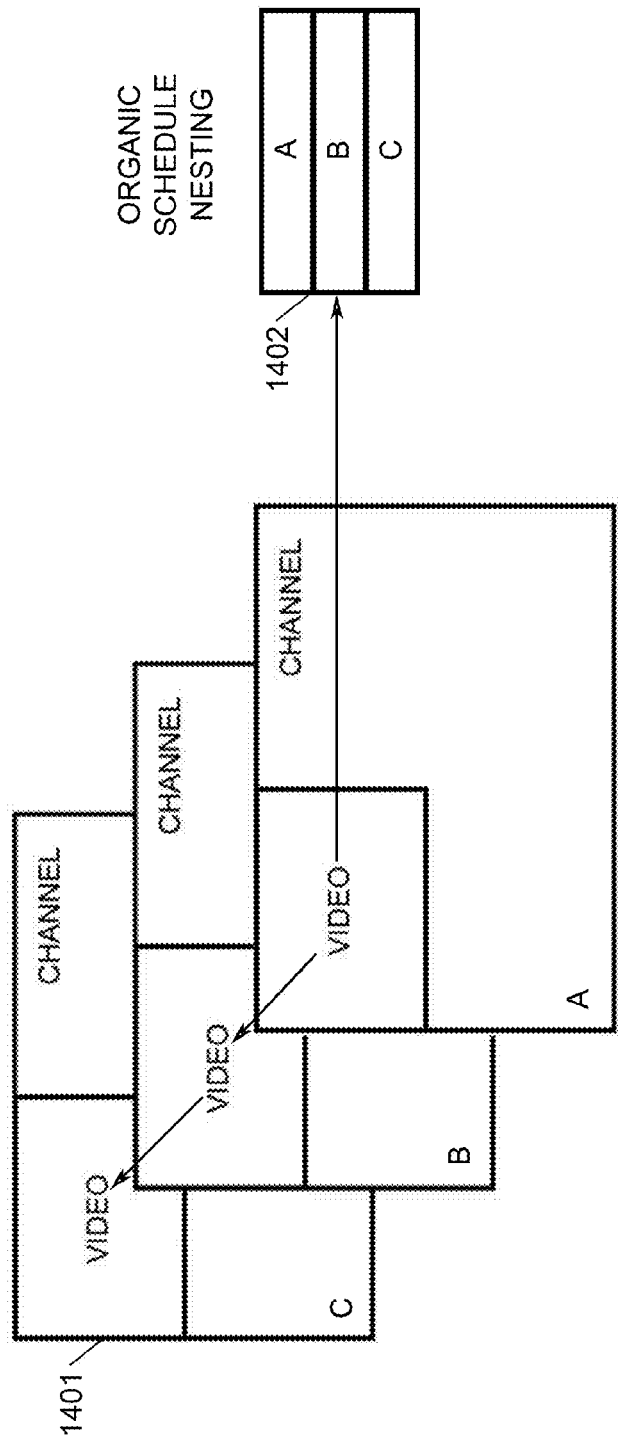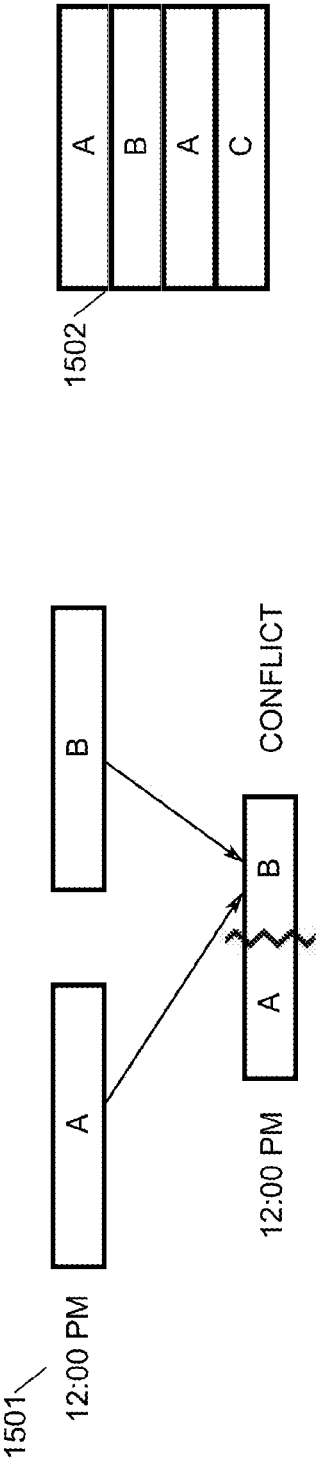
FIG. 14
FIG. 15

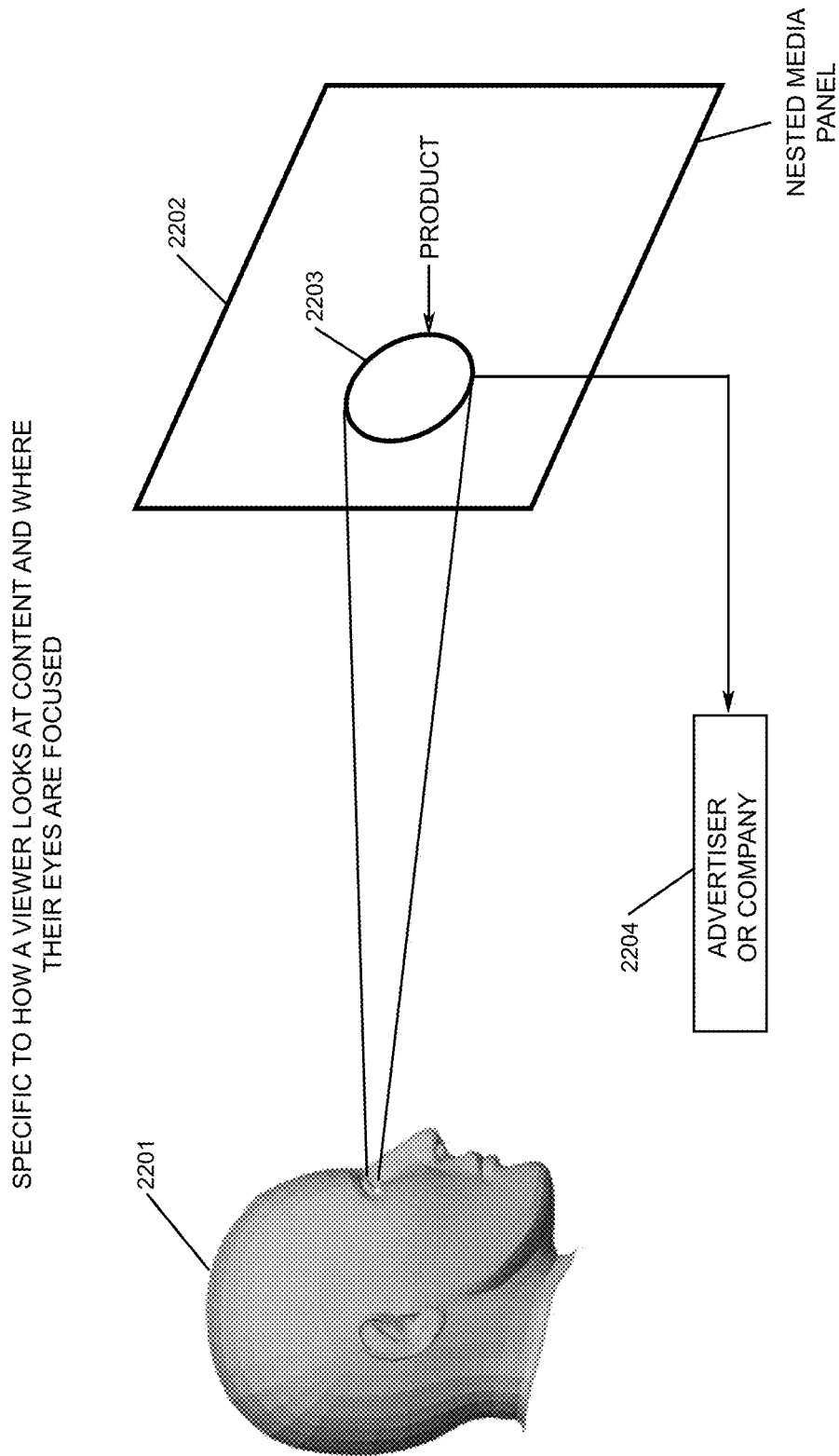

NESTED MEDIA CONTAINER, PANEL AND ORGANIZER

PRIOR APPLICATIONS

This application claims priority from Provisional Application Ser. No. 61/815,331, filed Apr. 24, 2013.

BACKGROUND OF THE INVENTION

Content, in its currently popular formats, including, but not limited to, streaming video, audio, images, articles, newspapers, magazines, periodicals, text books and blogs comprises a majority of the content that fills the world-wide-web and other user enabled networks. The concept of a portable media format, much like the VHS or DVD, has changed as different technologies and developers have created different ways to transport and distribute content and data. The contextuality of content is carried through search engines and social communities, but there is not a single multi-format container/panel and interface, that can be nested and brings these assets together into one organized multi-content deployable format.

BRIEF SUMMARY OF THE INVENTION

The inventive subject matter includes methods, processes and/or procedures to interconnect media through a content and/or data aggregation, delivery and search platform that unites the online magazine, social community, web radio, television formats, polygons and any other media format into a single portable package. These can be represented as channels and/or environments within panels or containers, which can then be pushed, pulled or broadcast into any current or future distribution platform, including, but not limited to, gaming consoles, web enabled televisions (smart TV), mobile devices, set-top boxes, wearable devices and computers.

BRIEF DESCRIPTION OF THE SEVERAL VIEWS OF THE DRAWINGS

FIG. 14 illustrates hierarchical data and content management based on nesting.

FIG. 15 illustrates schedule validation and content schedule conflict resolution.

FIG. 22 illustrates ocular responsive advertising where real-time data feedback is sent to advertisers on what a viewer is focused on and for how long.

DETAILED DESCRIPTION OF THE INVENTION

The following is a detailed description of the methods and apparatus for managing, manipulating and distributing content through a hierarchical nesting method and process. The system currently manages two forms of a wrapper format, and may be expanded to facilitate multi forms of wrapper format, which is a metafile format whose specification describes how different data elements and metadata coexist in a computer file. These initial wrappers, the Nested Media Container (NMC) and Nested Media Panel (NMP), work in conjunction with each other wherein the container (NMC) is the content and data management apparatus, and the panel (NMP) is the front-end user interface (UI) for viewing, manipulation and control of the content and data. Within this system, users can create customized brands as a specific channel type which will have a distinct digital thumbprint based on the contextual information of the data and metadata that form the content of that container or panel. This contextual meta-data is relayed back to online social communities, search engines and/or applications, so that each channel container's content is indexed and searchable.

Figure 1:
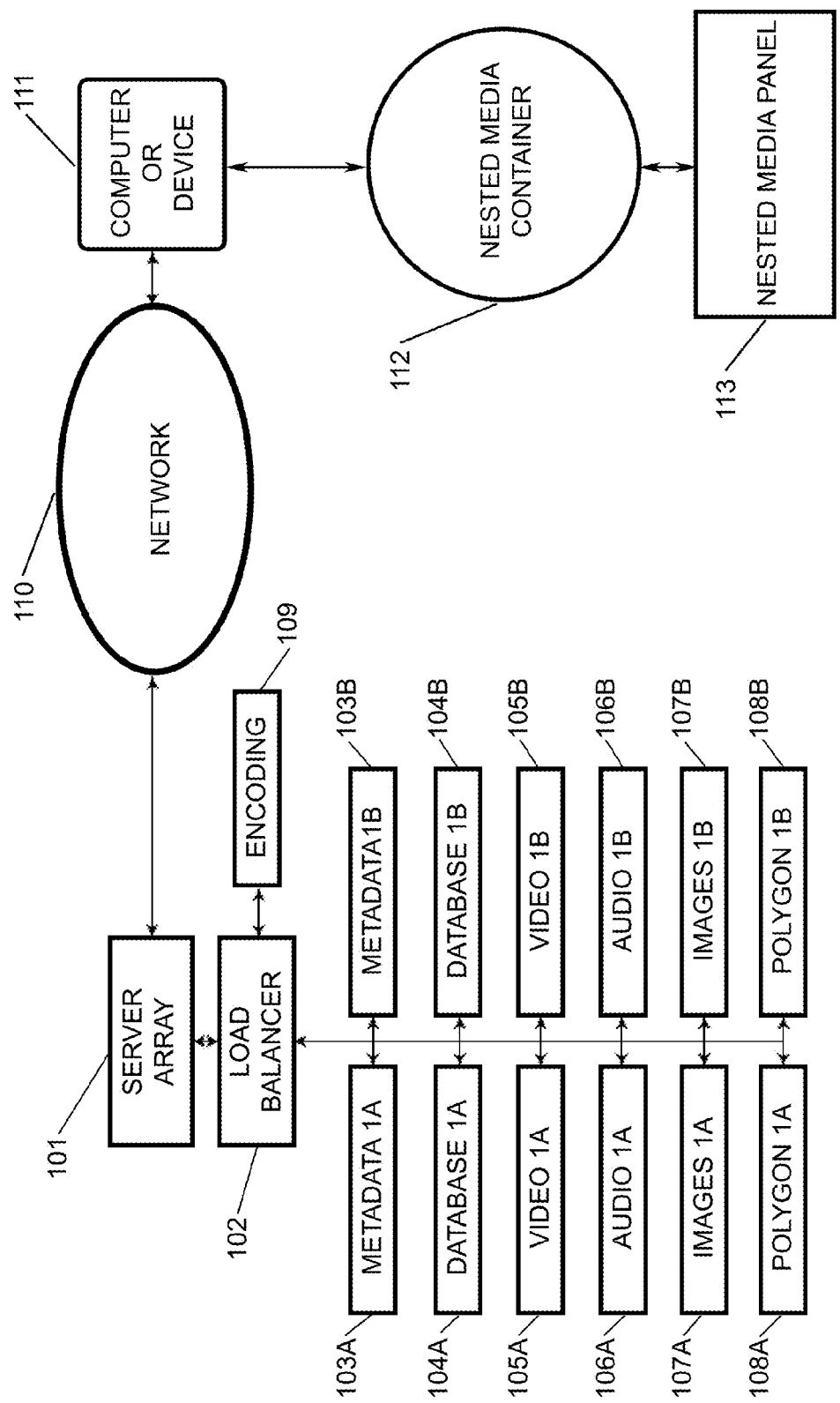
FIG. 1 is a network diagram of the content server array(s) and data fetch method and/or process to populate a media panel and/or container. This method uses a distinct server array in which data, metadata, content, video, audio, images, polygons and any other related data is segmented and decentralized onto specific server slices. This allows for a unique content archetype based delivery and authentication system.

The server side content delivery method, as illustrated in FIG. 1, involves an internally decentralized Content Delivery Network in which server hard drives, slices, partitions or segments are stored on clusters that hold that content archetype. 101 shows an example of an overall server array (both physical and virtual) in which a load balancer 102 (both physical and virtual) manages the content and data traffic as it passes through an internal network, through a public or private network to the end user. Directly attached to the load balancer is an encoding server 109 which handles the ingest, encoding and/or trans-coding of content into the server array. Content and data is then segmented into its designated server cluster and/or drive. 103A shows a metadata server, with a redundant clone of that server 103B, in which any metadata that is tethered to data and/or content extracted from outside sources (e.g., but not limited to, web, databases, metadata, content) is stored, managed and manipulated within this cluster. 104A and 104B house the databases for the server array. The content slices hold specific content archetypes on separate sections so that the server's resources are used efficiently, in essence holding and processing data at different system resource levels based on the needs of a specific content and data archetypes. The initial content and/or data types, including but not limited to, video 105A/105B, audio 106A/106B, images 107A/107B and polygons 108A/108B. This server array, and/or content distribution system, can be pushed, pulled or broadcast to any internal or external distribution point that will accept it, including, but not limited to, containers, panels, digital billboards, near-field and wi-fi transmissions to localized receivers, web/internet, print-on-demand, satellite, cable head-end or ISP, outside storage environment, physical or virtual distribution and ingest environment. This creates a unified distribution platform that is simple, lightweight on code, and nimble enough to work on a majority of current content distribution hardware solutions. This system can also be implemented on current set-top boxes that have an internet connection as a firm-ware and operating system update, replacing the channel itself with the Nested Media Container (NMC) or Nested Media Panel (NMP) user interface.

Figure 2:
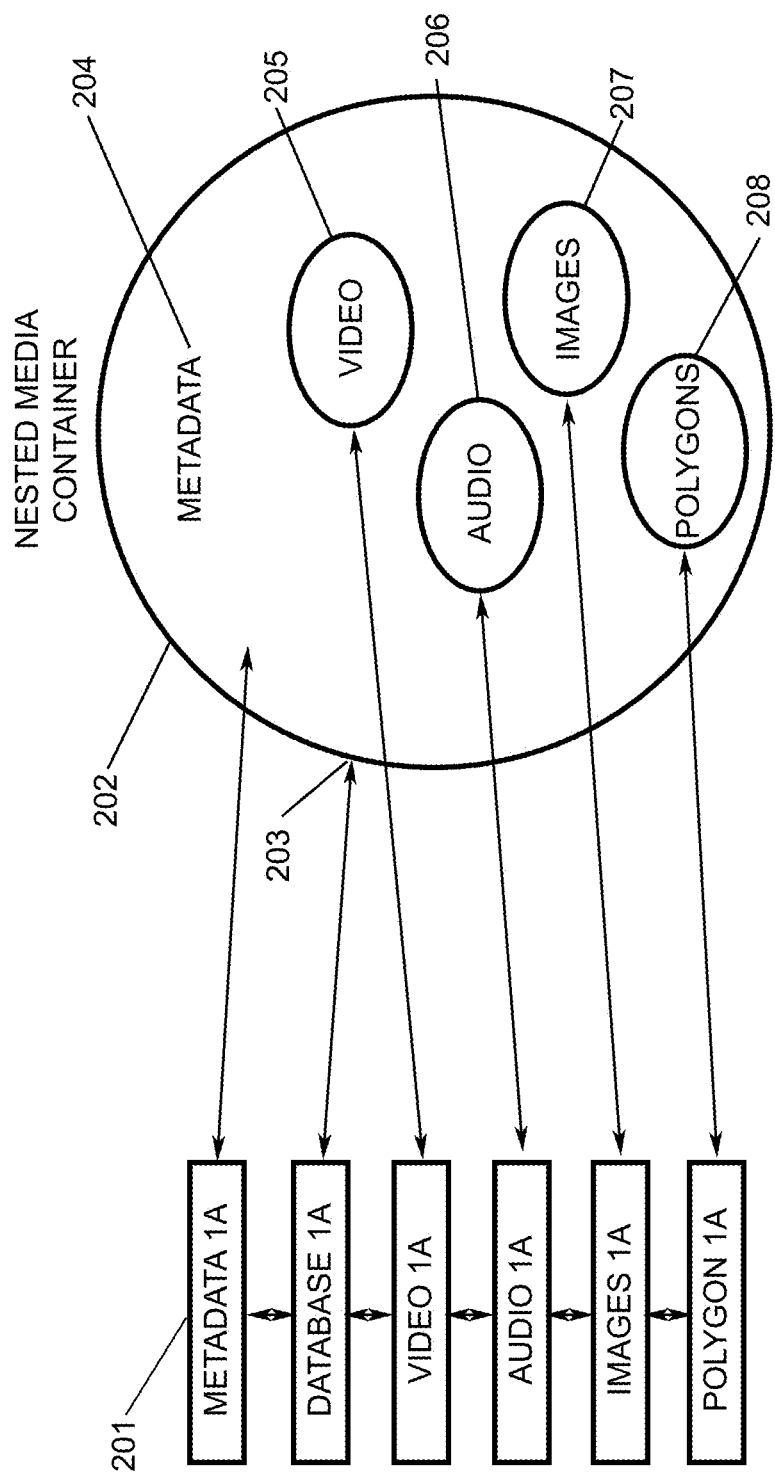
FIG. 2 is an example of content/data tethering between a Nested Media Container (NMC) and the server array, as well as the nesting component of an NMP.

FIG. 2 is an example of content/data tethering between a Nested Media Container (NMC) and the server array, as well as the nesting component of an NMP. 201 shows the server array as it pertains to the slices, drives and/or clusters that store, manage, manipulate, process, transport and/or deliver the content. 202 represents the entire NMC, where the container's shell is the outmost point at which data held within the container cannot move beyond, unless triggered to do so from an external and/or internal force, which can include, but is not limited to, merging with another container, data extracted from that container into another medium, ingest and/or organic functions triggering physical changes. 203 represents a tether link between the database(s) and the container's outer layer. This forms a bonded control mechanism that can include, but limited to, adjusting, changing, manipulating, deleting and/or migration of information within the database(s) whereas the outer layer becomes the master control mechanism to effect such variants. 204 shows how metadata becomes the "ether", or environment, in which any nested content and/or data archetypes sits within. This allows the metadata threads, from the server(s), array(s) or other sources, to effect the volume and size of a container based on the amount of information and content the metadata relates to. 205, 206, 207 and 208 represent, but not limited to, nested content and/or data containers in which data is managed, manipulated, controlled and relayed back to the server. This also allows nesting within nesting.

Figure 3:
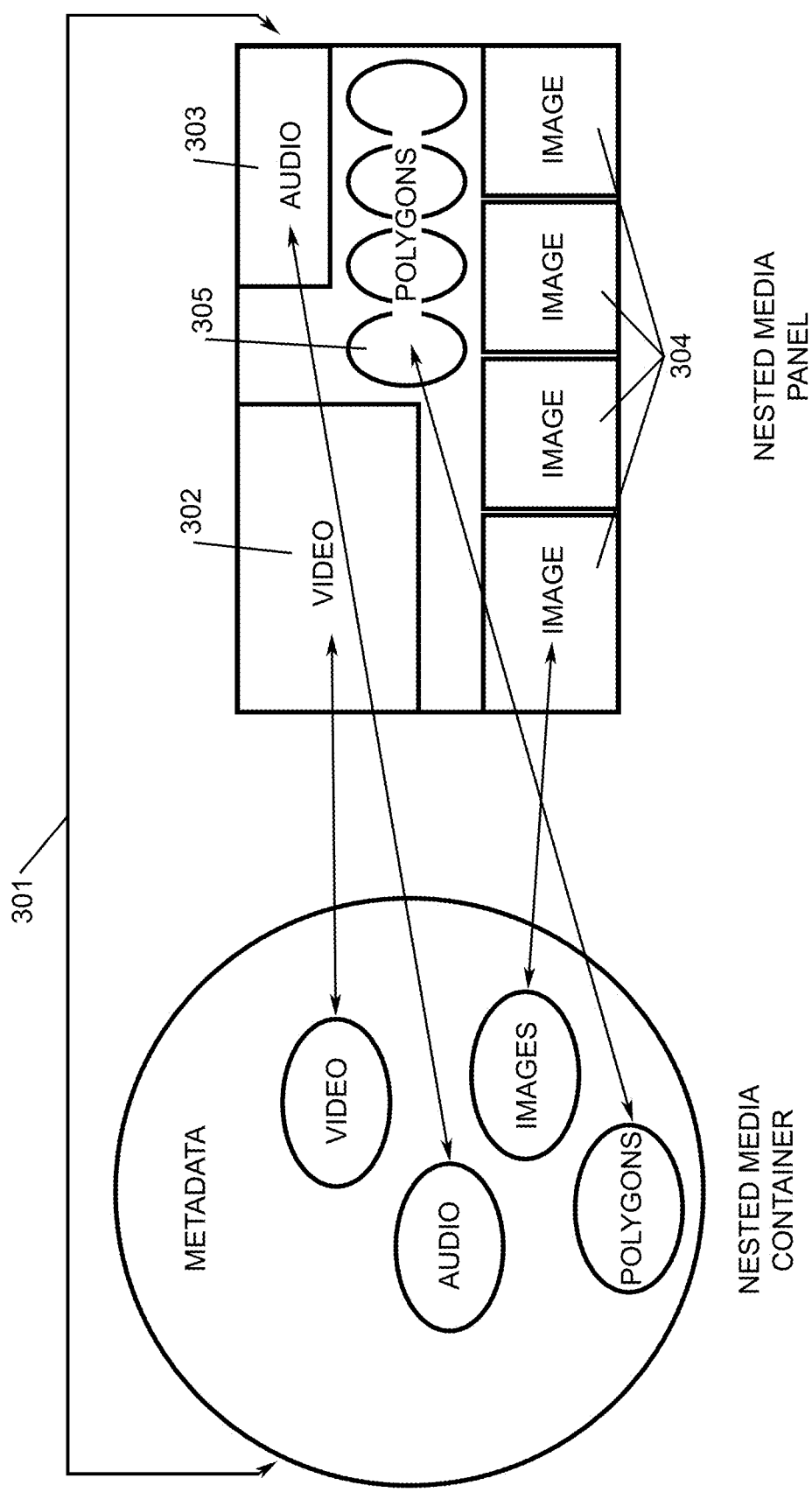
FIG. 3 illustrates the tethering process between a Nested Media Container (NMC) and Nested Media Panel (NMP), and how content based objects are nested within a panel interface. The container and panel share a unified data wrapper to create, manage and track relevant metadata links from source through viewer interactivity.

The process of tethering between a NMC and NMP is illustrated in FIG. 3. 301 shows the tethered link between the two or more container types, creating a management, manipulation and data exchange where any adjustment of, but is not limited to, information, metadata and/or content will affect any tethered container(s). 302 shows example of a link between a video container, held within the NMC, and the front-end user interface which populates the video content within the NMP. 303 shows an example of a link between an audio container, held within the NMC, and the front-end user interface which populates and plays the audio content within the NMP. 304 shows an example of a link between an image container, held within the NMC, and the front-end user interface which populates the images, both still and animated, within the NMP. 305 shows an example of the link between a polygon container, held within the NMC, and the front-end user interface(s) which populates the polygons within the NMP. Polygons can also represent content and/or data at the container level, bypassing the NMP as a user interface, and creating a direct container based polygon which can be skinned as almost any conceivable object that can be replicated as a polygon based model. When nesting panels and/or containers, the system initially looks for congruencies, similarities in metadata, content, audio, video, text, images and any other matching methods, procedures and/or processes to create inter-panel or inter-container threads that dictate how the new panel or container will show the content and/or data.

Figure 4:
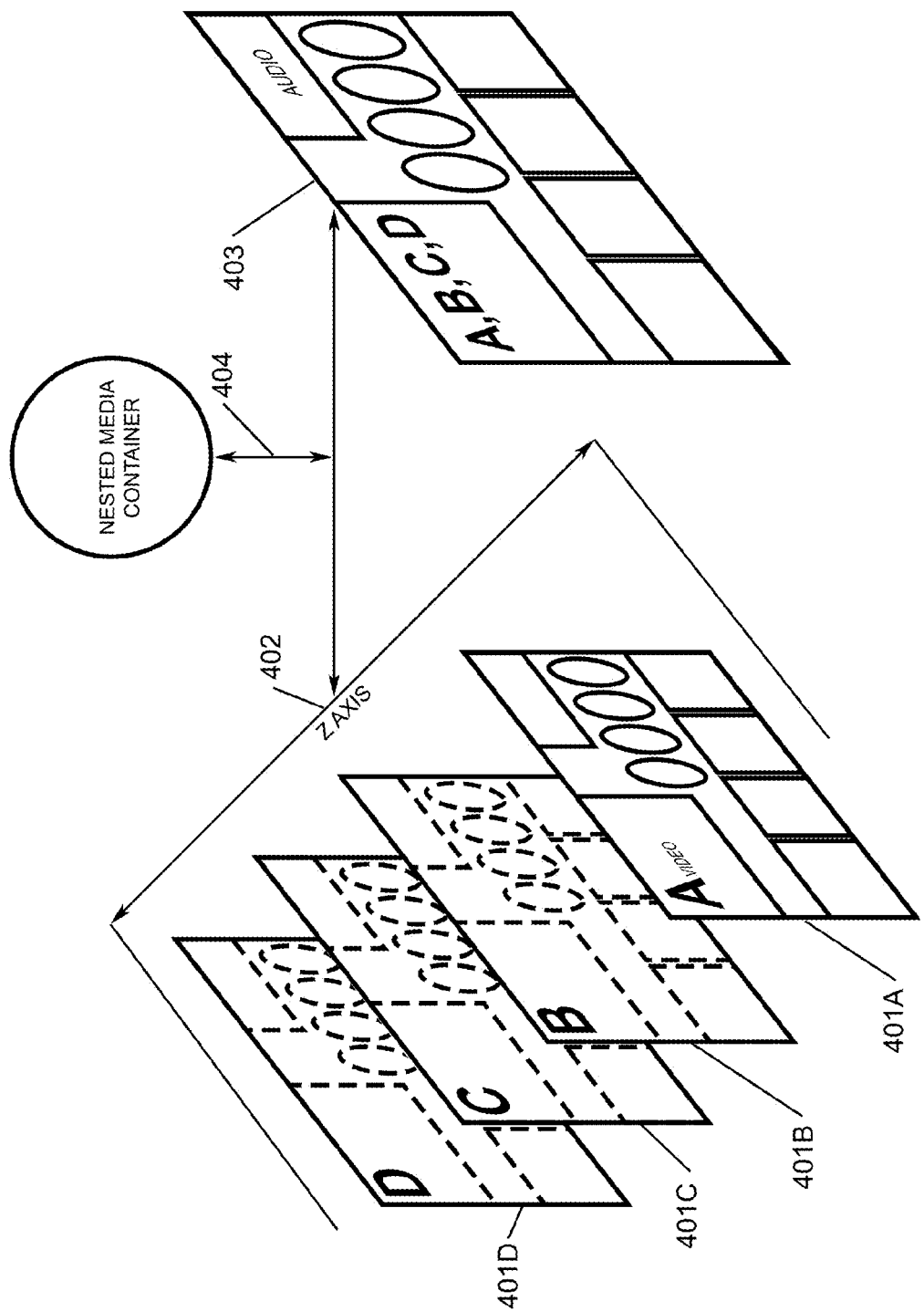
FIG. 4 illustrates the panel nesting process in Z axis space. A new panel is created from the nested panels, which retains the tethering relationship of those panels to a container.

FIG. 4 illustrates an example of the panel nesting process in Z axis space, where a new panel is created from the nested panels, which retains the tethering relationship of those panels to a container. 401A shows a front-facing panel and how the hierarchical stack, or nesting, of additional panels, 401B-401D, on the Z axis 402, creates a new combined panel state 403 in which content is nested based on several factors, including its hierarchical information. The method, process and/or procedure by which content and data/metadata is combined includes, but is not limited to, mathematical boolean expressions, parent/child relationships, value of data based on space between panels, adjustments of a panel in either X, Y or Z space, relationship of data within a container or panel and data adjustments based on time sequences. 404 shows the continual tethering of both the stack/nested panels and the combined content panel.

Figure 5:
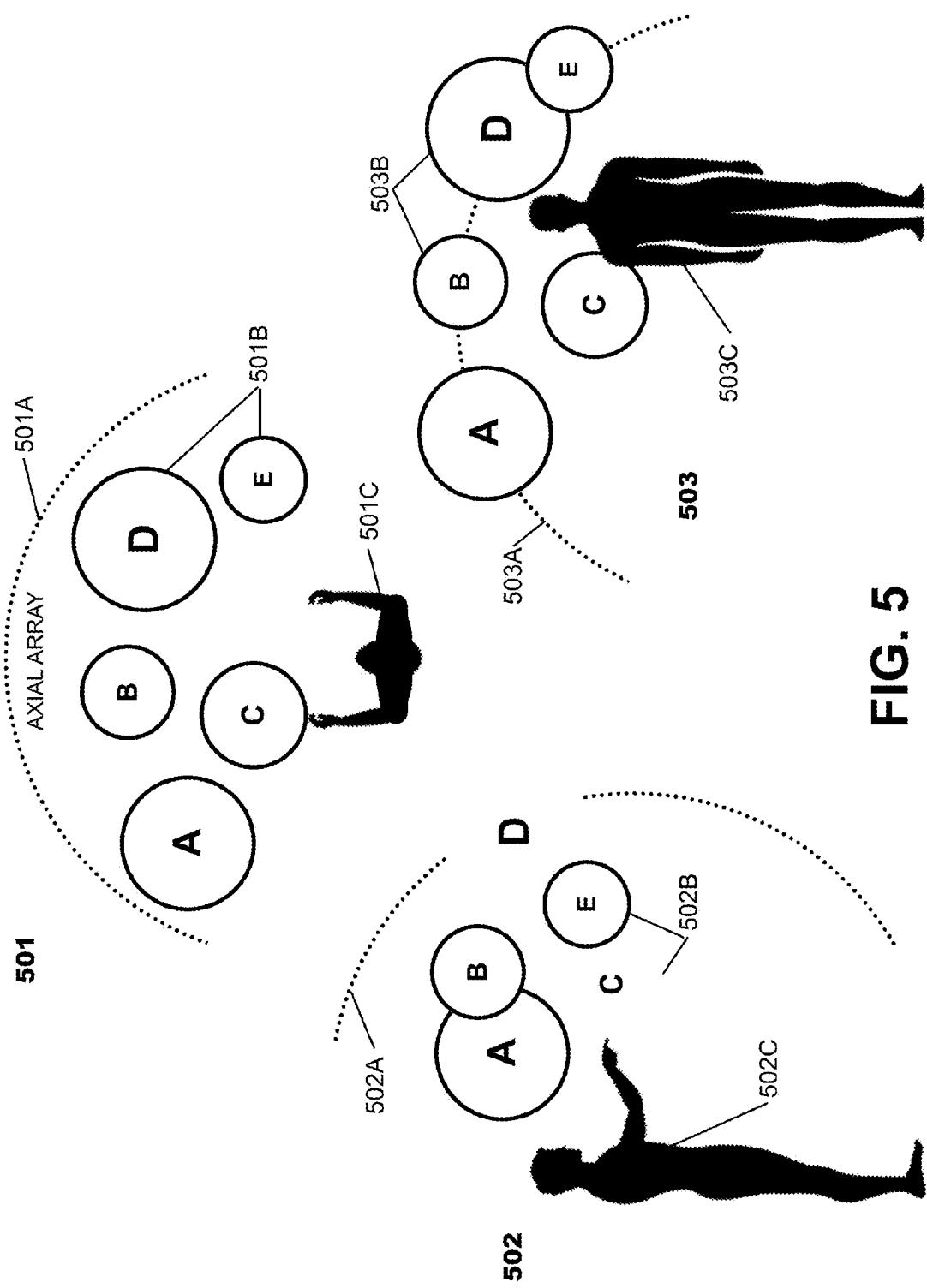
FIG. 5 illustrates an example of a user's tactile interaction with nested media containers in XYZ axial space as they relate to a user as the anchor and center of pivot.

Data and content interaction between a user (users) and the method, process and/or procedure of distribution and/or transportation have evolved to include, but is not limited to, heads-up displays, computer screens, augmented reality devices, mobile devices and holography. FIG. 5 illustrates an example of a user's interaction including, but not limited to, tactile, retinal and/or aural with virtual and/or physical Nested Media Containers (NMC) in XYZ axial space as they relate to a user as the anchor and center of pivot through any of the described methods. 501 illustrates a top view of a user's interaction with NMCs, wherein 501A shows an axial array as it relates to the user 501C, and how NMCs 501B can be controlled through, but not limited to, tactile interaction, gesture control, motion control, human input devices, audible control and/or any other method in which visual data can be manipulated and/or controlled. 502 shows the right side view of a user 502C interacting with the NMCs 502B and a prospective axial array path 502A. 503 shows a front view of a user 503C interacting with the NMCs 503B and a prospective axial array path 503A.

Figure 6:
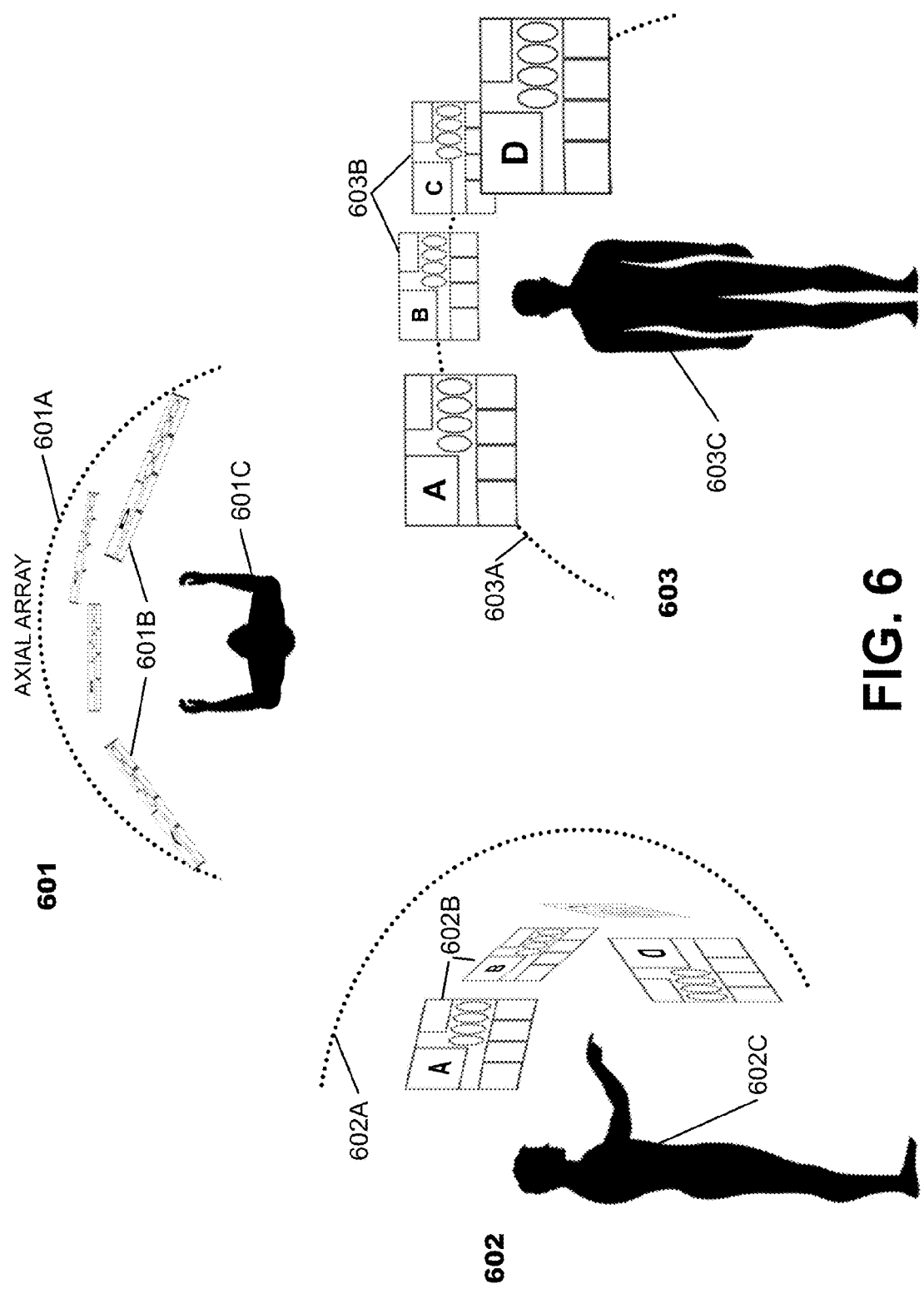
FIG. 6 illustrates an example of a user's tactile interaction with nested media panels in XYZ axial space as they relate to a user as the anchor and center of pivot.

FIG. 6 illustrates an example of a user's interaction including, but not limited to, tactile, retinal and/or aural with virtual and/or physical with Nested Media Panel (NMP) in XYZ axial space as they relate to a user as the anchor and center of pivot through any of the described methods. 601 illustrates a top view of a user's interaction with NMPs, where 601A shows an axial array, as it relates to the user 601C, and how NMPs 601B can be controlled through, but not limited to, tactile interaction, gesture control, motion control, human input devices, audible control and/or any other method in which visual data can be manipulated and/or controlled. 602 shows the right side view of a user 602C interacting with the NMPs 602B and a prospective axial array path 602A. 603 shows a front view of a user 603C interacting with the NMPs 603B and a prospective axial array path 603A.

Figure 7:
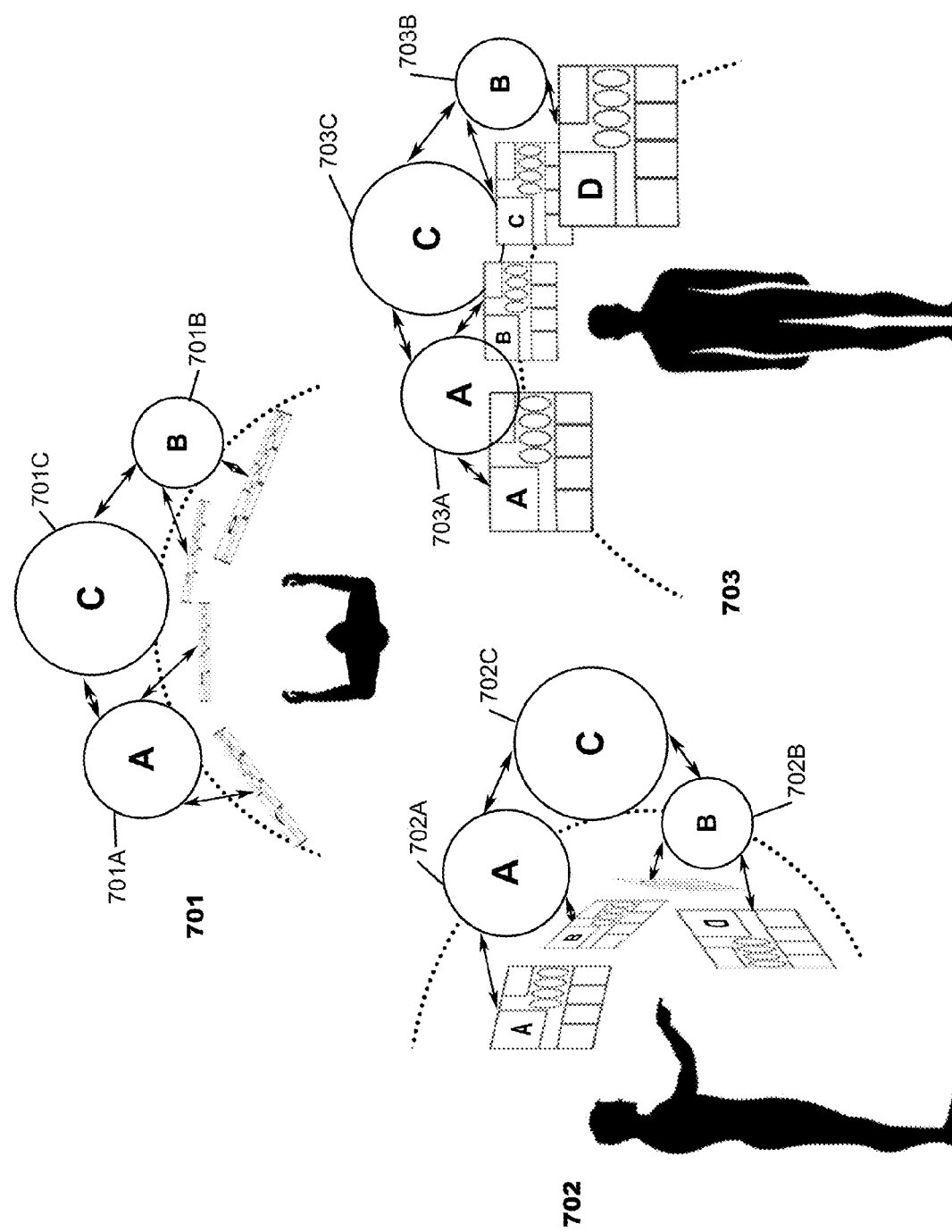
FIG. 7 illustrates an example of panel to container tethering in XYZ axial space.

FIG. 7 illustrates the combined view of both NMCs and NMPs and their spatial relationship to each other and the user(s). From the top view 701, the tethering between the parent containers and panels, 701A and 701B, shows an example of a direct nesting relationship, as well as an initial parent/child hierarchy. 701A and 701B are examples of nested children within 701C, which is an example of the overarching parental container. FIGS. 702 and 703 reflect this same hierarchical relationship from the right and front perspectives, whereas 702A, 702B, 703A and 703B are examples of the initial parent containers with respect to their nested NMPs, and 702C and 703C represent examples of the overarching parental container.

Figure 8:
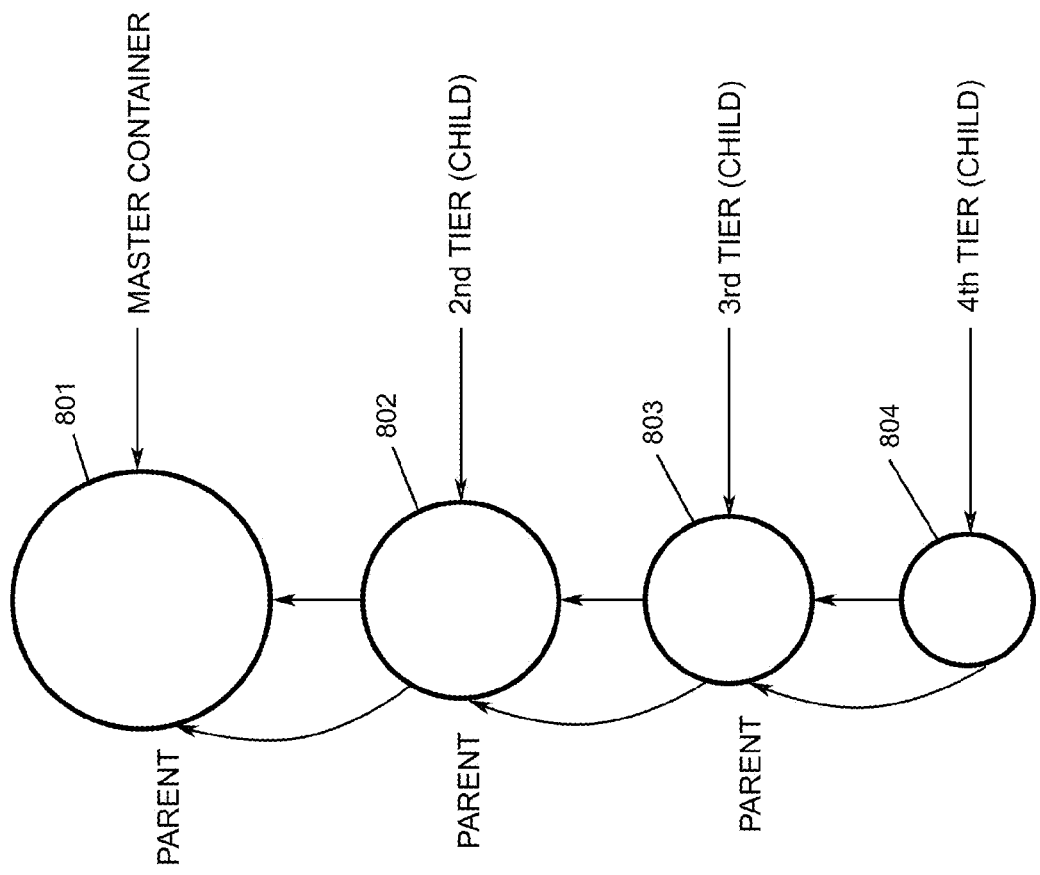
FIG. 8 illustrates the nesting of containers and how a container can be both a parent and child.

This system and its processes methods and/or procedures tracks, manages, manipulates and/or stores the hierarchical relationship of content that is embedded within a NMC or NMP. FIG. 8 illustrates an example of the nesting methods, processes and/or protocols for both containers and/or panels, and how each generation and/or level of nesting can inherit the parental and/or child role. 801 shows the top most container, or Master Container, which has the highest level in the hierarchical stack. 802 shows the $2^{nd}$ tier child which nests within the parent container 801. 803 shows a $3^{rd}$ tier child where 802 has now become the parent to that container. 804 shows a $4^{th}$ tier child where 803 has now become the parent to that container. This nesting process can waterfall down to indefinite levels.

Figure 9:
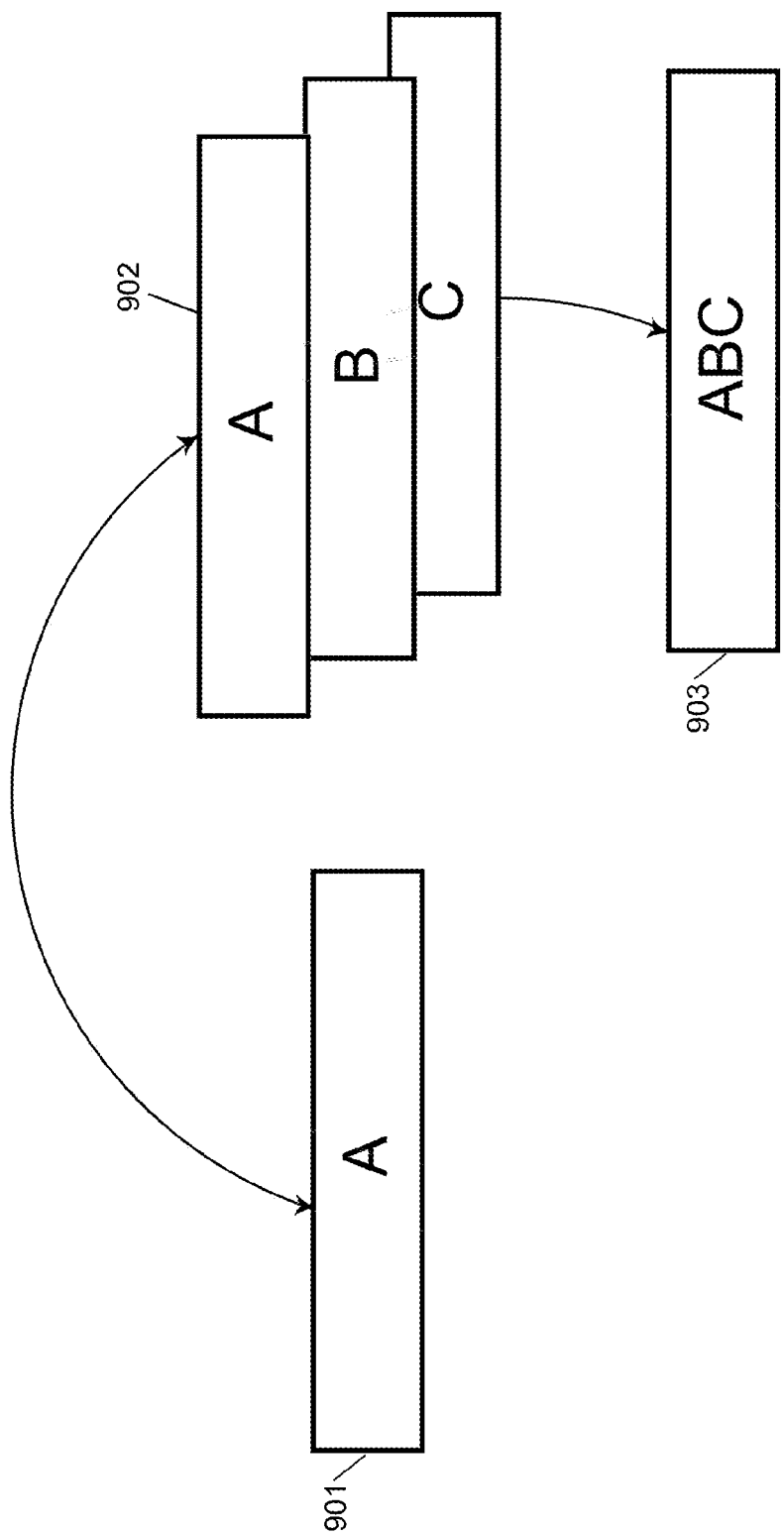
FIG. 9 Illustrates drag & drop nesting.
Figure 10:
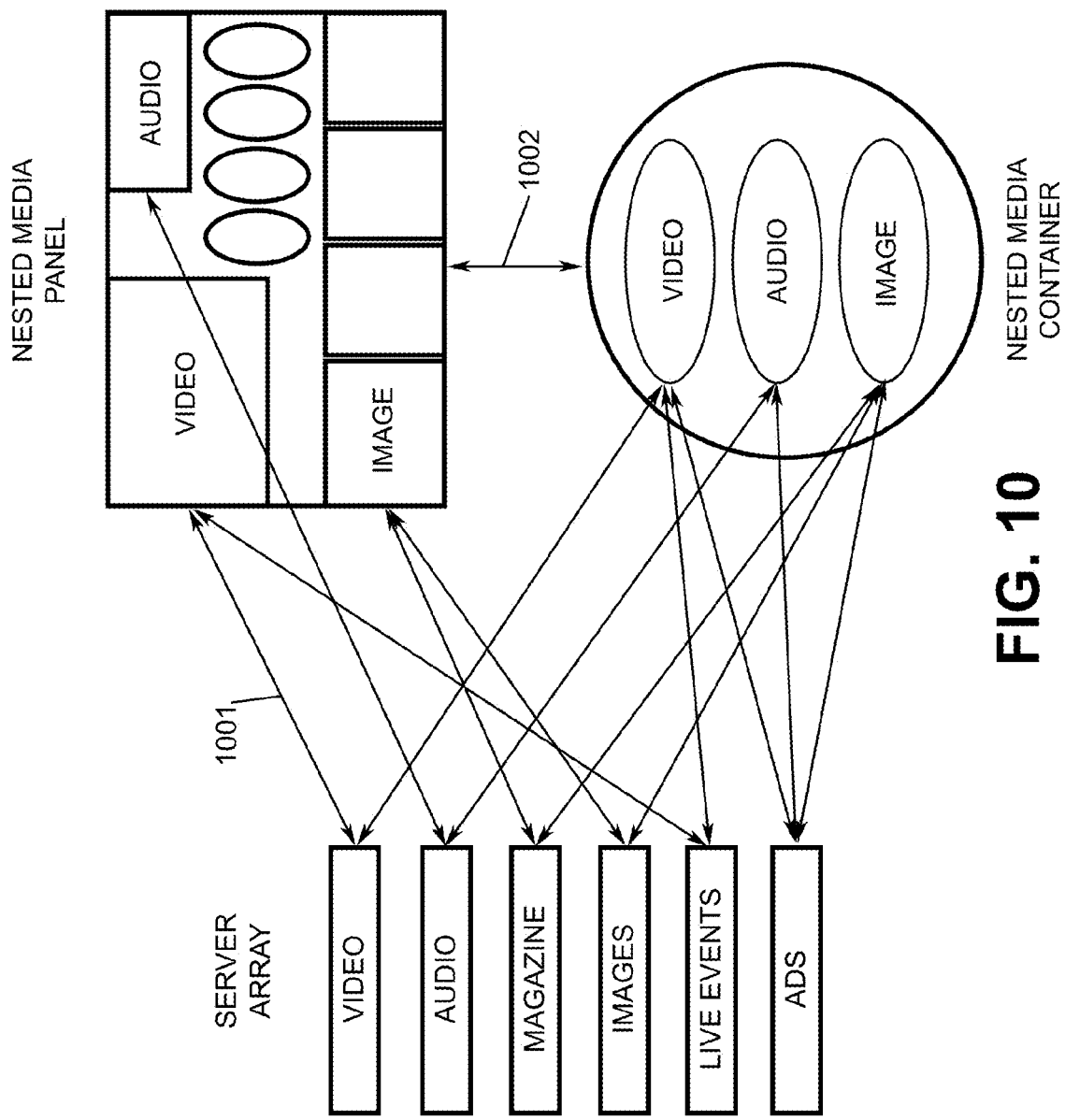
FIG. 10 illustrates drag & drop content validation.
Figure 11:
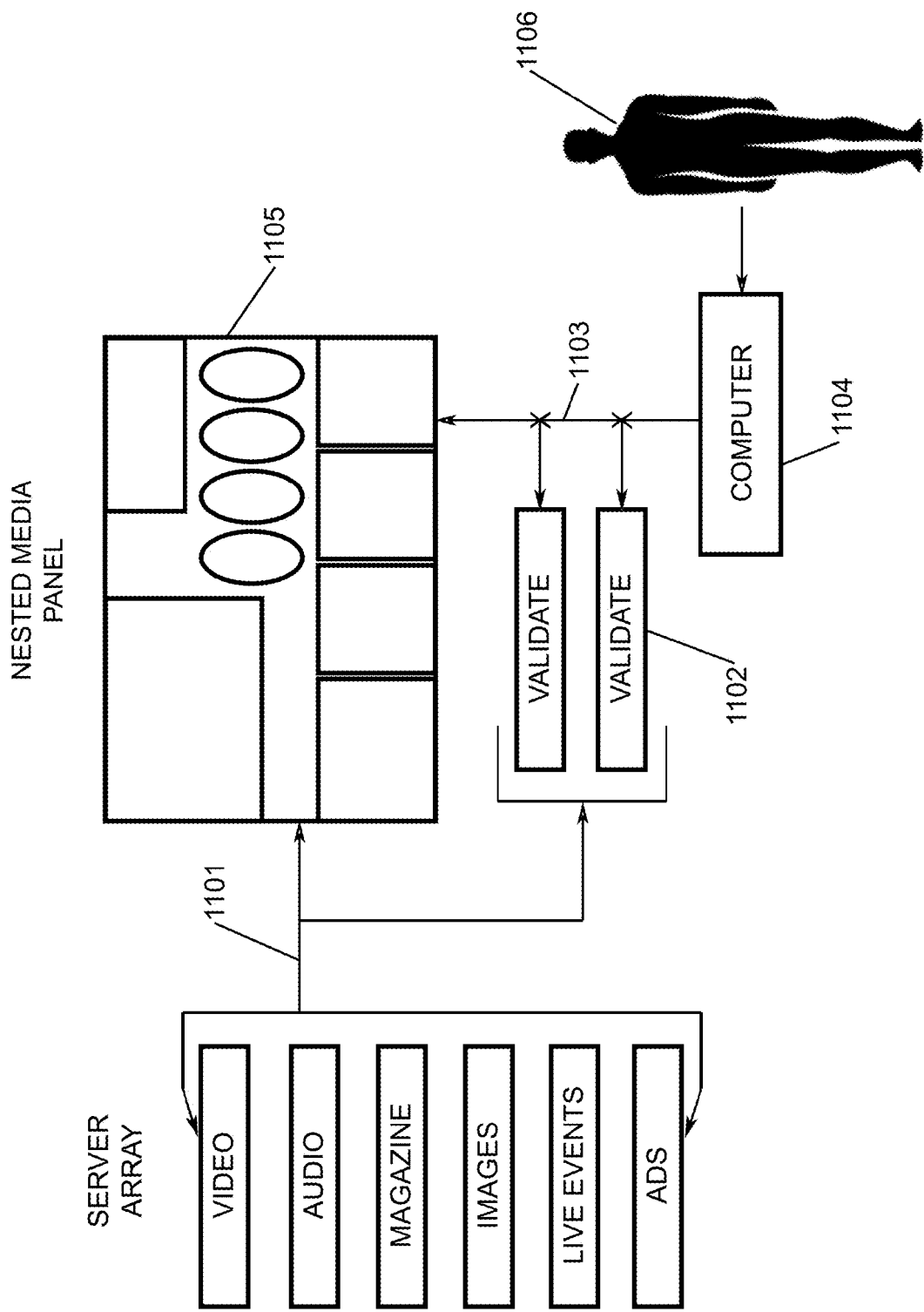
FIG. 11 illustrates the methods and process in which a nested media panel has embedded anti-piracy protocols.

Content, within the embodiment of this invention, held either in a NMC or NMP, can be dragged and dropped into a hierarchical stack. FIG. 9 illustrates an example of a piece of content and/or data 901 being dragged into a content array and/or stack 902 in which multiple pieces of content and/or data are then combined 903 into a new content snapshot. Any content and/or data, when originated from the server array FIG. 1, can also be dragged and dropped into a NMC or NMP as described in FIG. 10. This process includes a protocol, process and/or method for data validation which creates a constant metadata tether 1001 between the nested content and the server. This validation, both direct and indirect 1002, virtual and physical, allows for real-time and/or pre authentication of each piece of content and/or data as it is being shown. The implementations of this protocol create a distinct, virtual and/or organic anti-piracy method as illustrated in FIG. 11, in which the segmented tethered content 1101 is stitched together with a container or panel 1105. This is the only point at which all the elements of the content are in a single viewable location. As a user 1106 accesses the viewable content, a multistep validation process 1102 constantly checks the outgoing data/meta-data 1103, as it relates to the content and/or data, and takes an IP snapshot of the computer or device, virtual or physical, being used to access the content and/or data 1104. This method, process, procedure and/or protocol allows for a combined content and/or data view, but as soon as a prospective content pirate tries to extract, or rip, the content data, they would only be accessing snippets of content from the server array. Since the tethering process is handled dynamically, the pirate would have a hard time trying to re-stitch together the content into an outside format or container that held the same, or similar, dynamic content and metadata. This method, process, procedure and/or protocol includes the ability to track the pirate's movements and/or attempts to illegally secure the content and/or data, in essence, leaving a distinct digital fingerprint which can be tracked throughout its movement and lifetime.

Figure 12:
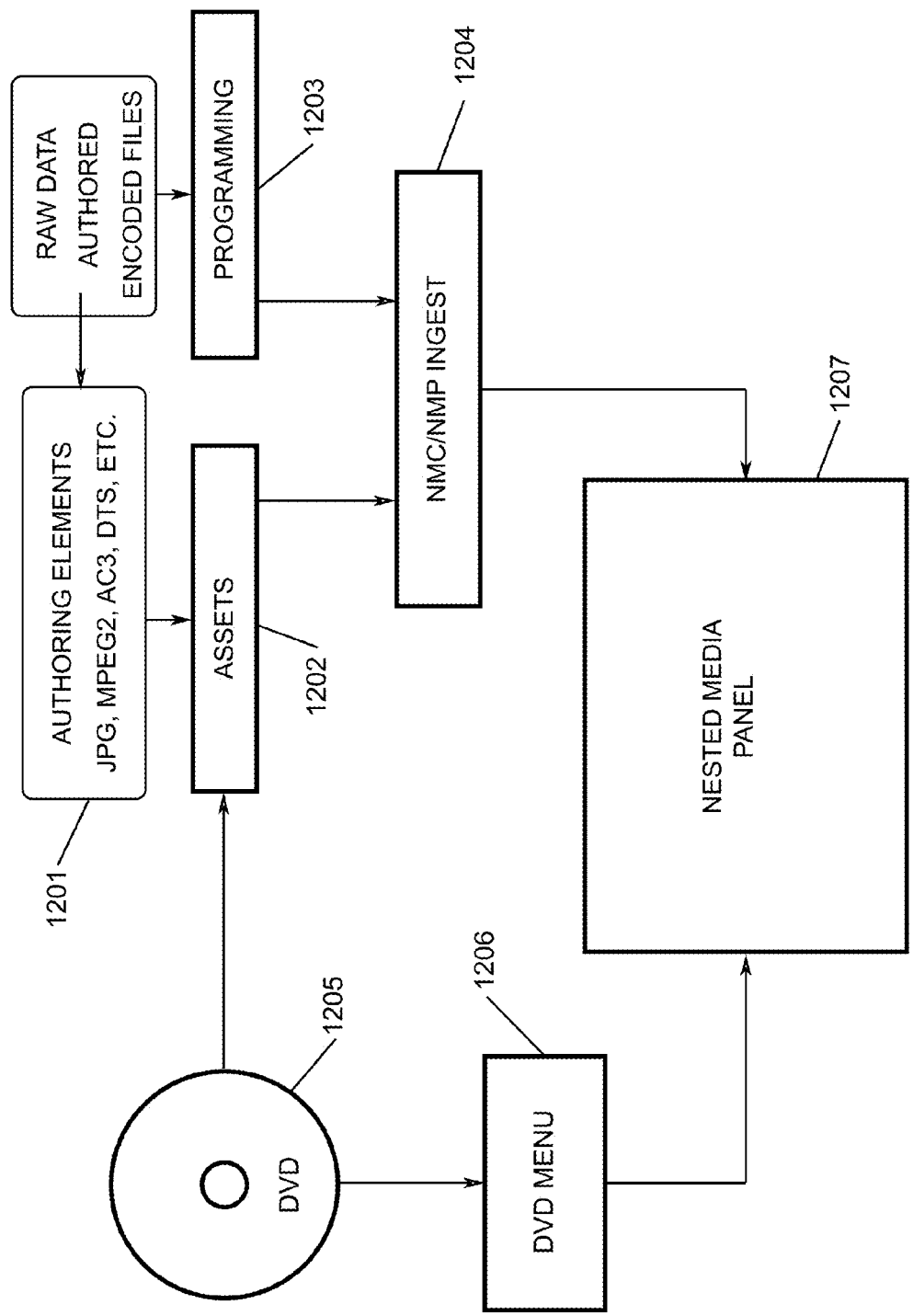
FIG. 12 illustrates the process of ingesting legacy digital media formats which carries over content, data, menus and functionality into a nested media panel.

There are many physical and virtual digital legacy formats, including, but not limited to, DVDs, Blu-Rays, HD DVD, CD-Roms and optical based mediums, in which content is authored into an interactive environment. The methods, processes procedures and/or protocols of this invention include, but are not limited to, legacy format ingest system(s) in which any content and/or data that has been authored into a unified medium can be extracted, manipulated, ingested and/or stored, whether pushed or pulled, into a NMC or NMP through the server array. FIG. 12 illustrates this process in which authoring elements 1201 including, but not limited to, JPEG, MPEG 2 (all formats), AC3, DTS and any other format wrapper is ingested along with any other authoring assets 1202 and programming elements 1203, which can include, but is not limited to, GRPMs, JavaScript, Java code, highlight and button mapping data, video chapter breaks, button functionality, user functions, digital author signatures, pre and post commands and any other program data that relates to authored content. The NMC/NMP ingest 1204 process, for example, can take a DVD 1205 and menus 1206 and reorganize that data into an NMC or NMP 1207 so that the same, or enhanced, functionality and content from the originating DVD are carried into the container and/or panel. This process and method allows for a unified virtual portable digital content format that can be, but not limited to, moved, migrated, transferred, transported, affected, manipulated, managed and/or stored as either a container and/or panel into any virtual or physical device, between devices and/or users based upon authentication protocols described herein and/or defined by the content owner.

Figure 13:
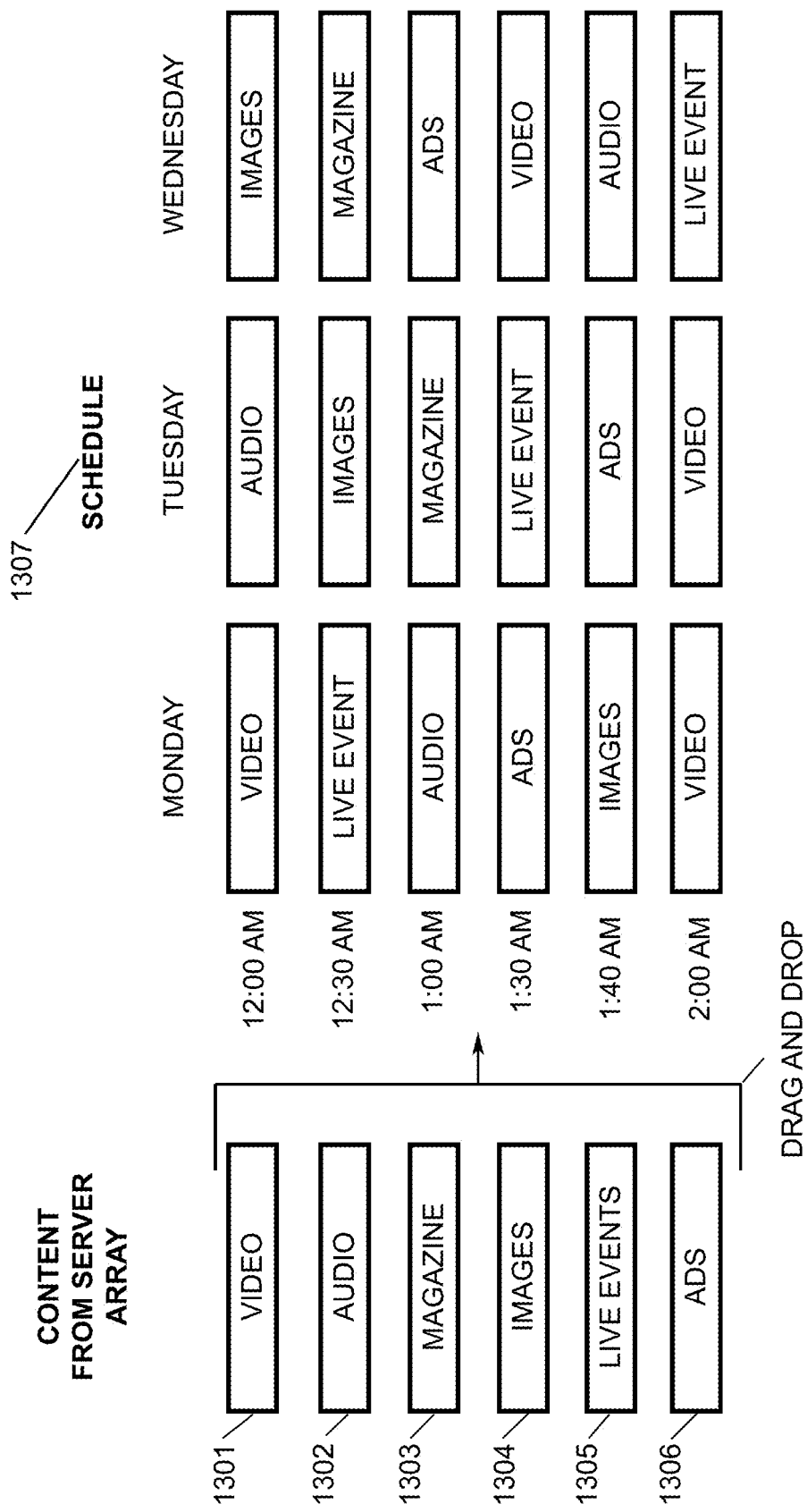
FIG. 13 illustrates an example of the drag & drop scheduling system.

The programming of content is handled through a method of drag and drop scheduling as illustrated in FIG. 13. This is an example of where any content asset type, 1301-1306, can be dynamically dragged and dropped into a live, or pre-programmed, play-out schedule 1307. This scheduler can play, in succession, different content types, including, but not limited to video, audio, live events, images (as still, galleries, or galleries with audio), advertisements, magazines (with or without video and/or audio content) and any other form of content and/or data. Content and/or data can be swapped or changed up to seconds before going live.

Play-out schedules can also be organically created as illustrated in FIG. 14. This example shows how multiple containers or panels 1401, once nested or sub-nested, can created an aggregate schedule 1402 of the content and/or data that is held within each NMC or NMP. If there are any scheduling conflicts, as illustrated in FIG. 15, in which two or more content programs 1501 share the same time schedule, the system can suggest alternate times, suggest on-demand content which they can schedule when they choose to replace one or more of the conflicts, or give the user a choice of what content to omit and what to accept into their custom schedule 1501.

Figure 16:
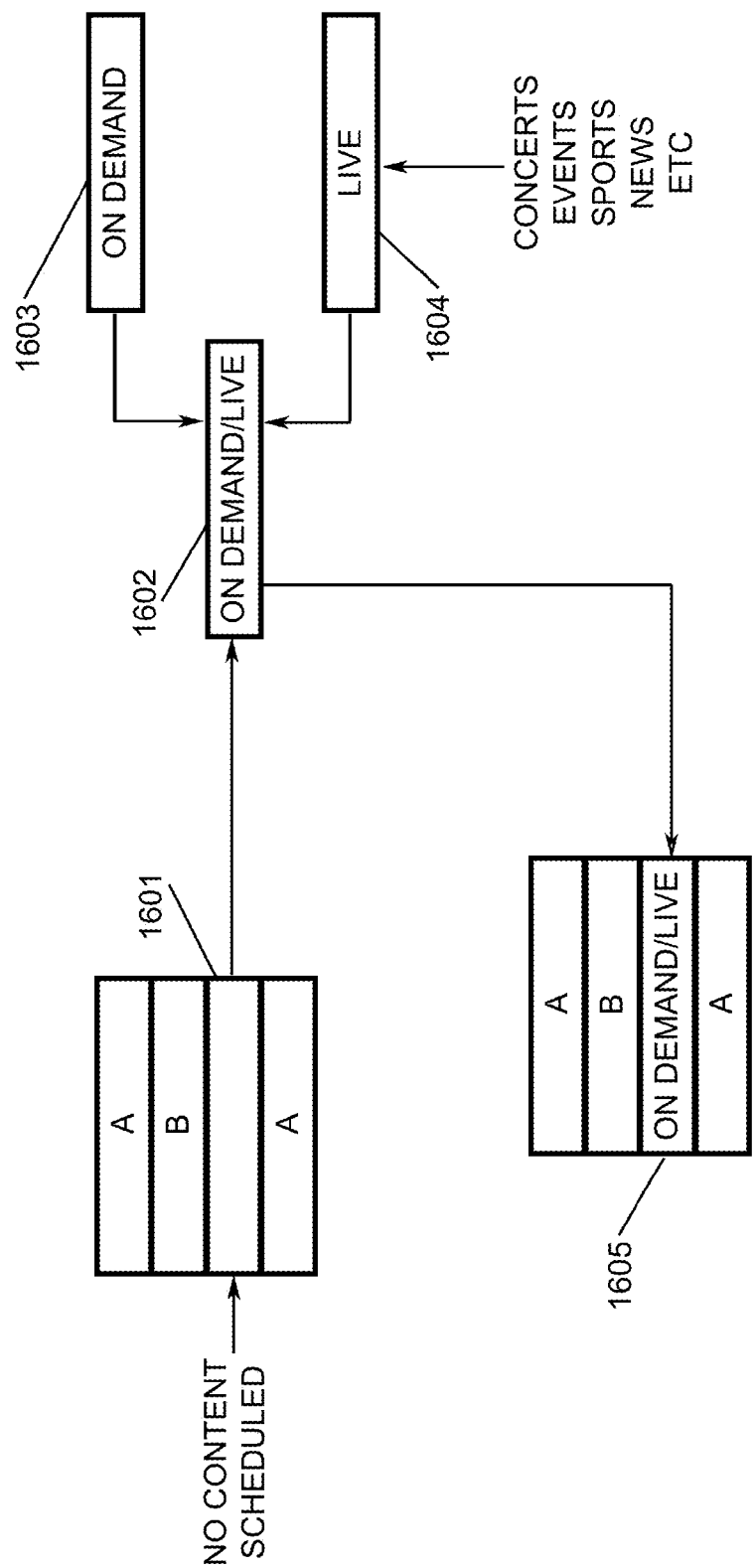
FIG. 16 illustrates how on-demand and live content can be embedded into an active schedule.

FIG. 16 illustrates an example of how on-demand and live content can be embedded into an active schedule.

Users can drag and drop live and/or on-demand events/content and/or data into the scheduling system as illustrated in FIG. 16. Where a schedule 1601 may be made up of content and/or data that can be stored on the server array or content that is sourced or stored outside of the array can be inserted into the schedule. Examples like on-demand 1603 and live events/content 1604 are ported through a virtual or physical scheduling container 1602, which can then be embedded into any schedule, panel and/or container 1605 that the user has security access to. Giving flexibility and numerous options for anyone scheduling content for their NMCs or NMPs. This is extremely useful for communities, both virtual and physical, and/or organizations that prefer to communicate, move or behave in sync with each other. This includes the scheduling system's ability to notify user, users, community, organizations and/or social groups about upcoming content schedules within a pre-defined and/or organic timeframe and/or sequence.

Figure 17:
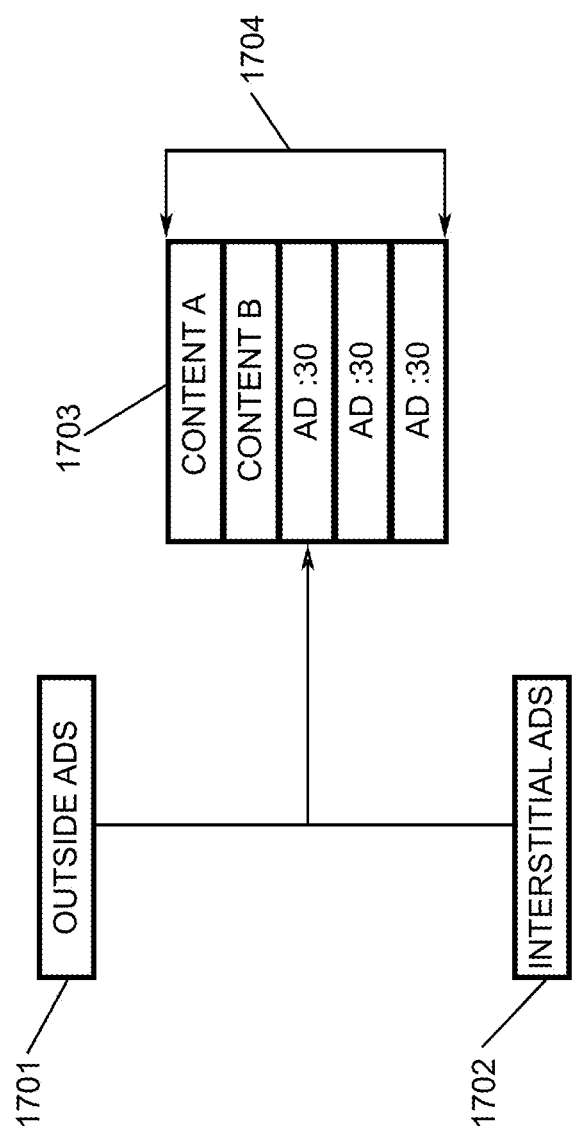
FIG. 17 illustrates automatic adjustment of available time, within a schedule, when embedding advertising.

Much like FIG. 16, where outside content and/or data can be embedded into a schedule, FIG. 17 illustrates automatic adjustment of available time, within a schedule, when embedding advertising or any other form of marketing. Where internal or external ads 1701, which is example of any advertisements that are not held within a user's container or panel, as well as any interstitial ads 1702, which includes, but is not limited to any content advertisements within a user's channel, container and/or panel, content advertisement within an outside user's channel, container and/or panel and any other source of interstitials when added to a schedule 1703 automatically adjust the time available 1704 for additional content or advertisement to be added. The managing user of that schedule will be notified of any remaining time available.

Figure 18:
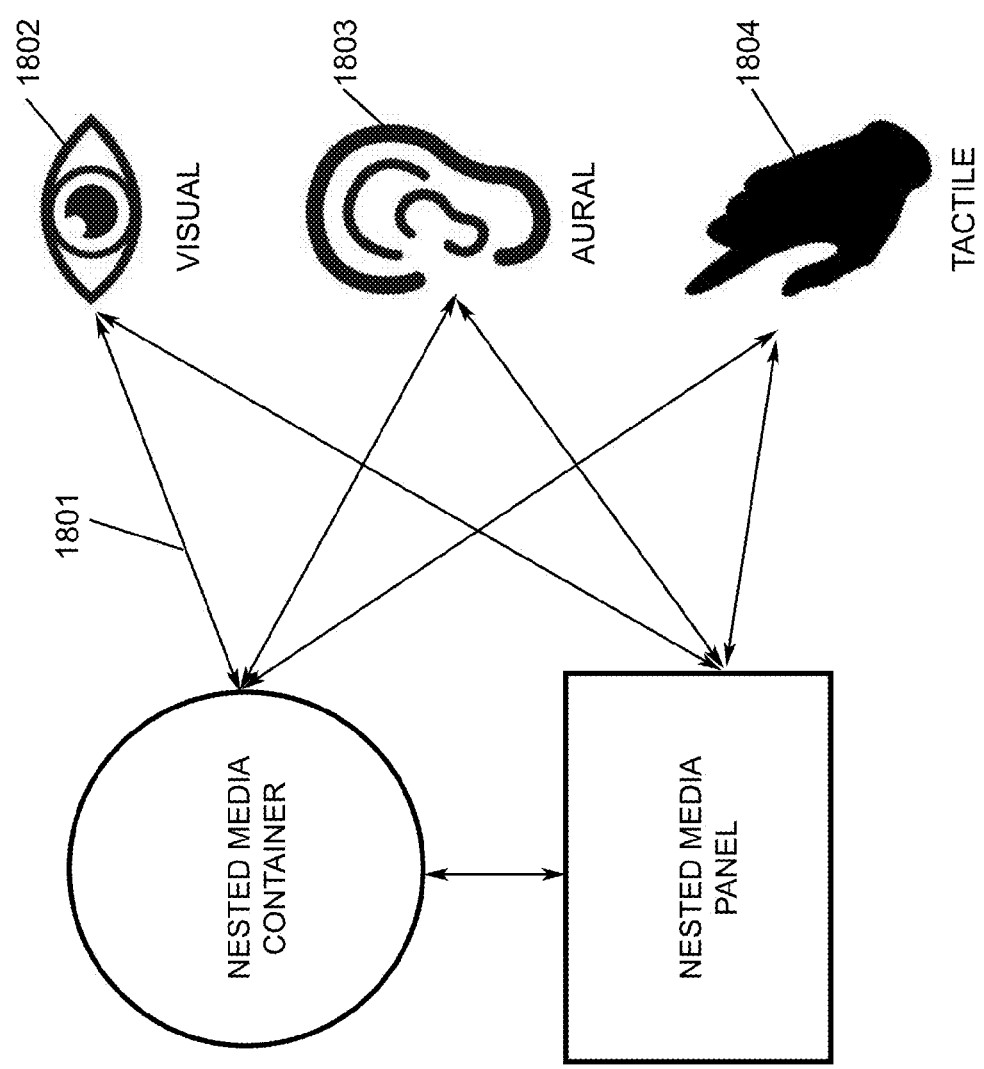
FIG. 18 illustrates various methods of user control and sensatory feedback from nested media panels and containers.

FIG. 18 illustrates various methods of user control and sensatory feedback to and/or from NMCs and NMPs. 1801 illustrates the two-way communication between an NMC and/or NMP and a user's control and feedback via sensatory responses. These can include, but are not limited to, visual 1802, aural 1803, tactile 1804 and any other interactive sensatory control and feedback method, solution, process and/or procedure that is known or is developed in the future.

Figure 19:
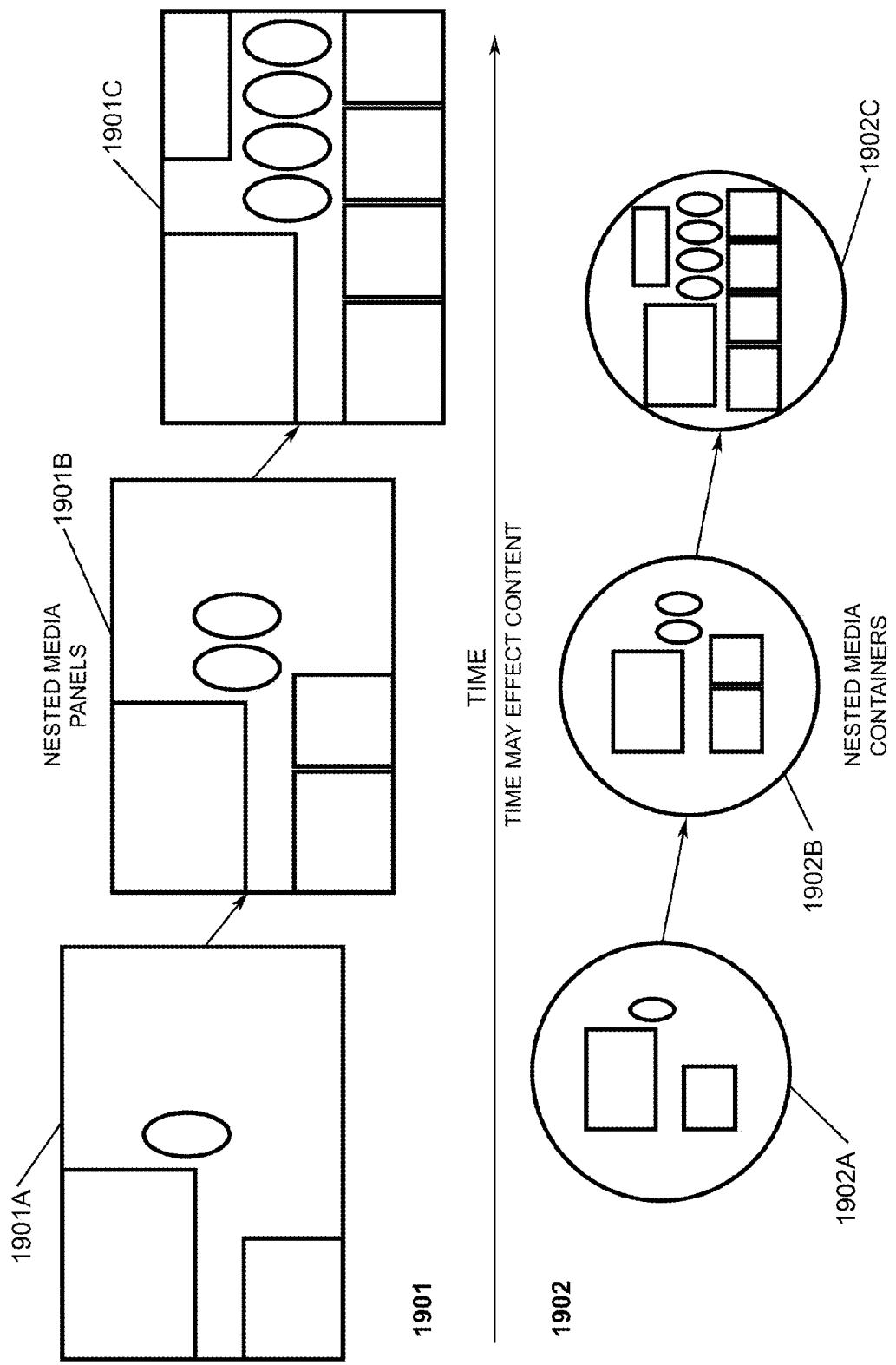
FIG. 19 illustrates the effects of time on content that is nested in a panels and/or container.

Time can affect any content and/or data that is held within a NMC or NMP as illustrated in FIG. 19. These effects on an NMP 1901 can include, but are not limited to visual shifts of content and/or data, addition or subtraction of content, reorganization of content and/or merger of content. 1901A-1901C shows examples of content and/or data additions over time. The same time variants affect NMCs 1902 in the same fashion, where 1902A-1902C illustrates content and/or data additions over time.

Figure 20:
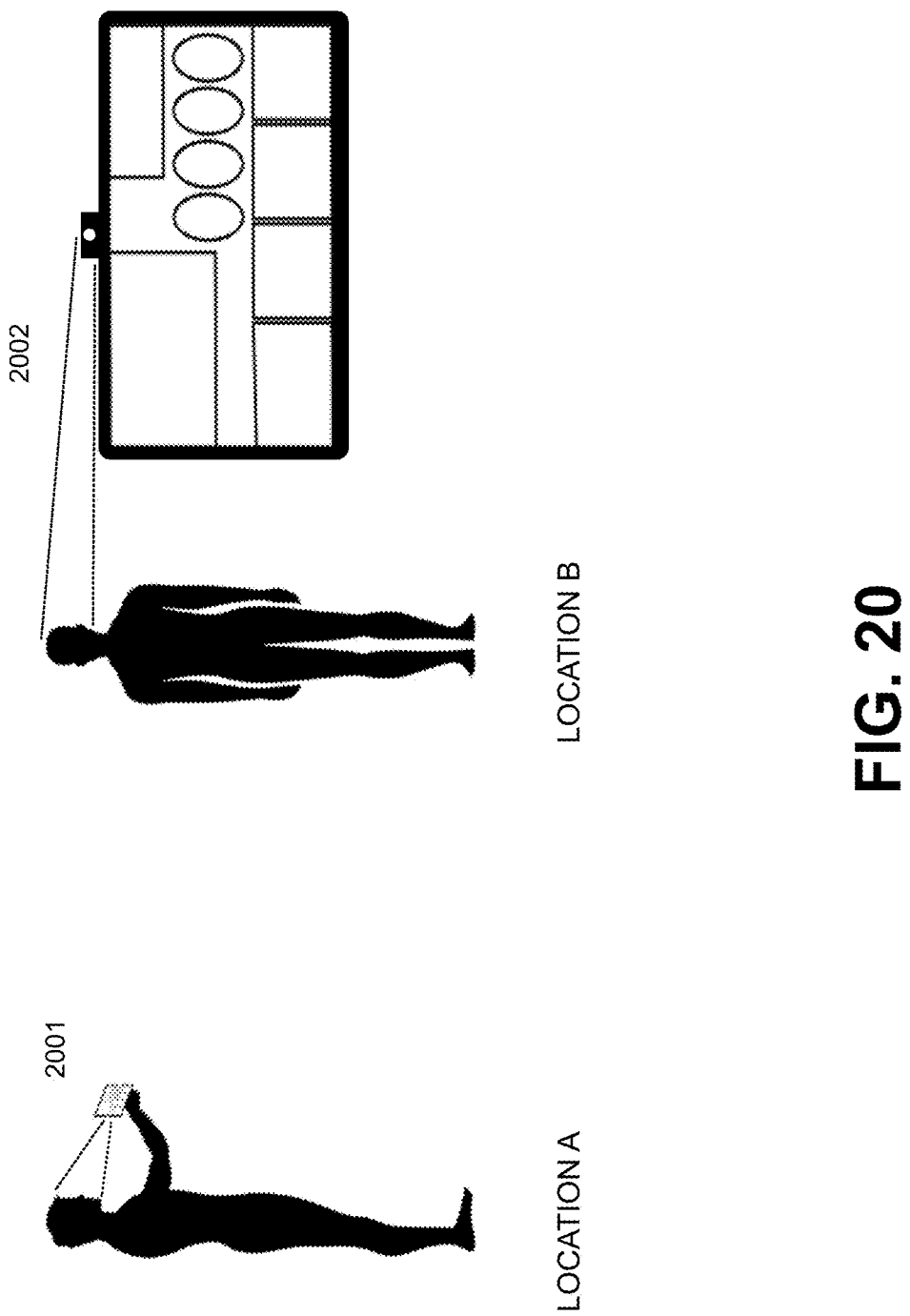
FIG. 20 illustrates accessing content through a panel or container from multiple locations using biometric authentication.

NMCs and NMPS, when accessed from different virtual, physical and/or altered locations, can have biometric, or other forms, of individual authentication as illustrated in FIG. 20. In this example a user in location A 2001 is viewing an NMC or NMP via a mobile device in which they are authenticated using optical recognition technology. There are many modes and methods of biometric authentication including, but not limited to, optical recognition, thumbprint, DNA, bio-feedback, human body frequency fall-off and many other developed and as-yet to be developed methods, processes, procedures and protocols. Any or all of these methods, processes, procedures and protocols can be used to authenticate access to an NMP and/or NMC from any location that has access the server array, including, but not limited to internet, intranet, extranet, wi-fi and/or Bluetooth. 2002 shows an example of a second location, location B, in which a user is authenticated visually through a smart television.

Figure 21:
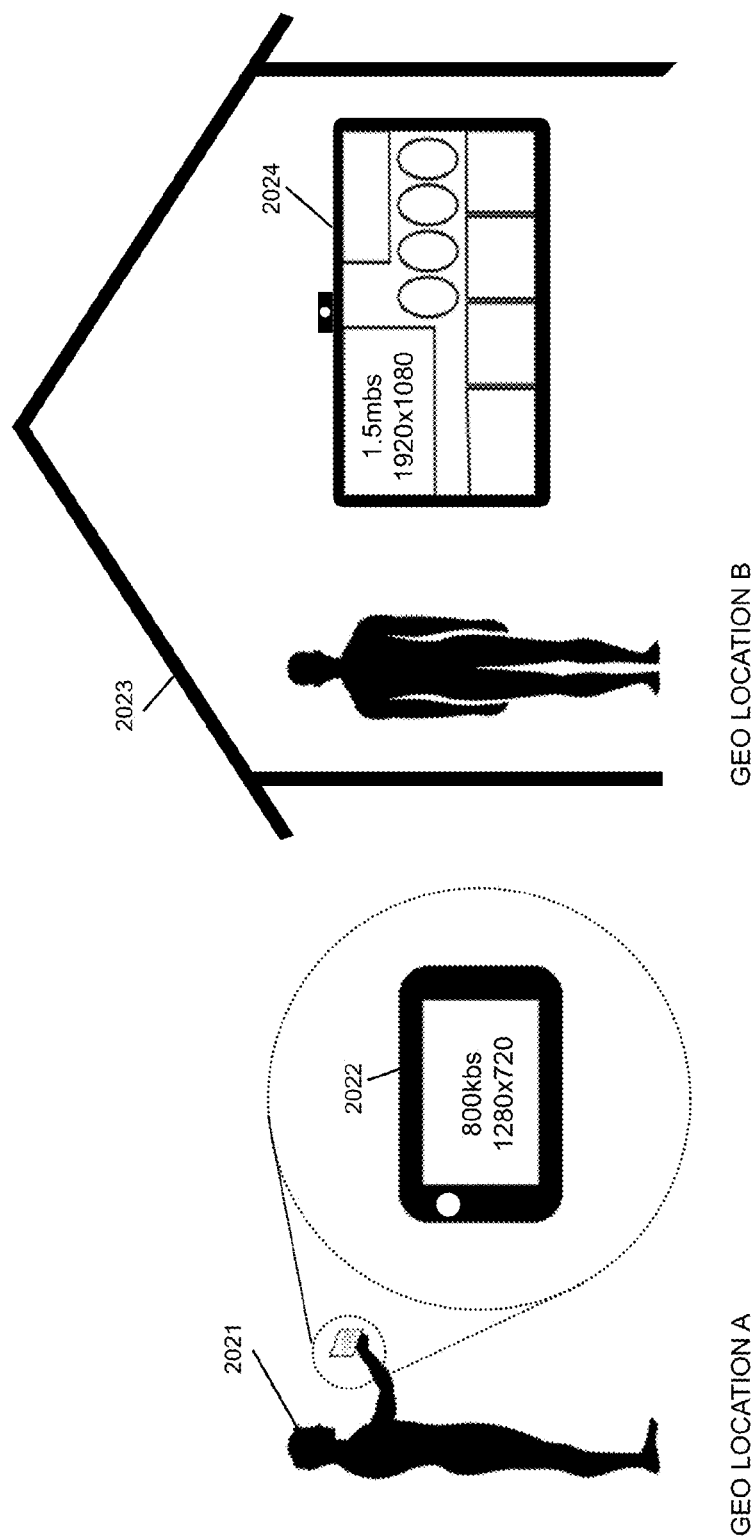
FIG. 21 illustrates location based resolution and bandwidth changes based on the different devices in the same or different locations.

FIG. 21 illustrates an example of location based resolution and bandwidth changes based on different devices in the same or different locations. Where a user at geo location A 2021 will see content through an NMC or NMP which automatically adjusts the resolution and bitrate to be optimized for both the device being used 2022 to view and content and the available bandwidth to that device at the time of viewing. Geo location B 2023 represents a second location, in this case a home, in which the device where the NMC and/or NMP being viewed is on a larger format smart TV 2024.

The responsive methods FIG. 22 gives an example of ocular responsive advertising where real-time data feedback is sent to advertisers 2204 on what a viewer 2201 is focused on 2202 and for how long. This method, process, procedures and protocol of real-time responsive feedback allows a more organic process for advertisers and companies when making critical market and consumer based decisions, and allows them to adjust and effect changes back to the device 2202 in which the user is viewing the content. This can include, but is not limited to, aural, tactile, optical, audible and/or any other sensatory capture method. This also allows for multiple viewers to be identified and tied to their viewing habits, as well as track how long they are actively or inactively viewing the content.

Thus, specific embodiments and applications of the inventive subject matter have been disclosed. It should be apparent, however, to those skilled in the art that many more modifications besides those already described herein are possible without departing from the inventive concepts herein. The inventive subject matter, therefore, is not to be restricted except in the spirit of the appended claims.

The invention claimed is:

1. A method for dynamically rendering a user interface to media linked in a hierarchical container relationship using panels matched to content types within the containers, the method comprising:
   constructing a first media container on one or more computing systems, the first media container comprising:
      a first content location on a server, the first content location including first content data;
      a first set of metadata describing the first content, the first metadata including a first content type of the content and a first hierarchy on a Z-axis describing a display priority;
   constructing a second media container, the second media container comprising:
      a second content location on a server, the second content location including second content data;
      a second set of metadata describing the second content, the second metadata including a second content type of the content and a second hierarchy on the Z-axis;
   constructing a third media container, the third media container comprising:
      metadata describing a third hierarchy on the Z-axis;
   processing a request from a user to construct a tether within the third media container to contain the first media container and the second media container;
      adding, to the third media container, a first set of links to media containers, the set of links including a first link to the first media container and a second link to the second media container;
      creating metadata, in the third media container, describing the tether to the first media container and the second media container;
   processing a request for a display system to display the third media container in a volumetric environment using hierarchy on the Z-axis;

examining, by the display system, the first set of links of
the third media container includes the first link and the
second link;
determining congruencies in metadata or content between
the linked first media container, the linked second
media container and the third media container containing the set of links;
traversing the first set of links, by the display system, and
selecting the first link for-preparing for display;
matching, by the display system, a first media panel at
runtime to the first media container based at least in part
on the first content type included in first set of metadata
and the congruencies in metadata or content;
tethering, by the display system, the first media container
to the first media panel;
creating a first inter-panel thread of the first media panel
to form a dynamically generated first user interface for
representation of the first content data;
traversing the first set of links, by the display system, and
selecting the second link for preparing for display;
matching, by the display system, a second media panel at
runtime to the second media container based at least in
part on the second content type included in the second
set of metadata and the congruencies in metadata or
content;
tethering, by the display system, the media container to
the second media panel;
creating a second inter-panel thread of the second media
panel to form a dynamically generated second user
interface for representation of the second content data;
finishing traversing the first set of links, by the display
system, and matching third media panel to the third
media container for display at runtime based at least in
part on the first media panel, second media panel and
third media container and the congruencies in metadata
or content;
tethering, by the display system, the first user interface
and the second user interface to the third media panel;
creating a third inter-panel thread of the third media panel
to form a dynamically generated third user interface by
creating a combined panel state of a multi-layered
z-axis combination of the first user interface and the
second user interface to form the third user interface
based at least in part on the third metadata and the first
hierarchy on the Z-axis and the second hierarchy on the
Z-axis; and
providing the third user interface for display.

2. The method of claim 1, wherein receiving the request by the display system to display the third media container in a volumetric environment using hierarchies on the Z-axis further comprises receiving the request from a web browser.

3. The method of claim 1, wherein receiving the request by the display system to display the third media container in a volumetric environment using hierarchies on the Z-axis further comprises receiving the request from an application server.

4. The method of claim 1, wherein determining the first set of links of the third media container includes the first link and the second link further comprises determining, by the display system, the first set of links of the third media container includes the first link and the second link.

5. The method of claim 1, wherein determining the first set of links of the third media container includes the first link and the second link further comprises determining, by the third panel, the first set of links of the third media container includes the first link and the second link.

6. The method of claim 1, wherein the first media container further comprises a second set of links to media containers.

7. The method of claim 6, wherein selecting the first media panel further comprises:
selecting the first media panel from a set of media panels based at least in part on a first content type and content types of media containers referenced in the second set of links; and
modifying the preparing for display of the first content data based at least in part on metadata of the media containers linked in the second set of links.

8. The method of claim 1, wherein the first hierarchy on the Z-axis and the second hierarchy on the Z-axis are z-axis values.

9. The method of claim 1, wherein the first hierarchy on the Z-axis and the second hierarchy on the Z-axis are layer order.

10. The method of claim 1, wherein the first media container and first media panel share a unified data wrapper.

11. The method of claim 1, wherein selecting the first media panel further comprises selecting the first media panel based at least in part on a first content type.

12. The method of claim 1, wherein selecting the first media panel further comprises selecting the first media panel from a set of media panels based at least in part on a first content type.

13. A system for displaying media comprising:
content storage configured to store content data;
a nested media container system comprising storage configured to store one or more nested media containers, each comprising:
a content location provided by the content storage, the content location including content data;
a set of metadata describing the content data, the metadata including a content type of the content data and a hierarchy on a Z-axis;
a set of links to nested media containers;
a nested media panel system configured to prepare for display one or more nested media containers, the nested panel system comprising a processor and configured to:
receive a request to prepare for display a nested media container;
select a nested media panel based at least in part on a correspondence between a nested media container and a nested media panel, the correspondence based at least in part on determining congruencies in metadata or content between the nested media containers linked within the nested media container;
when nested media containers exist within the set of links, create an inter-panel thread corresponding to a nested media panel for each linked nested media containers within the set of links to prepare the nested media containers that exist within the set of links for display;
receive display data based on the linked nested media containers as prepared from corresponding nested medial panels;
provide the display data and a link to the nested media container to the nested media panel to prepare for display a combination of the display data and the nested media container based at least in part on the metadata of the linked nested media containers and the hierarchy on the Z-axis of the linked nested media containers, the combination forming a combined display data; and
providing the combined display data for display.

14. The method of claim 13, wherein the nested media container system further comprises media container storage.

15. A computer program product comprising a non-transitory computer-readable storage medium storing program code for causing one or more processors to perform a method, the method comprising:
- constructing a first media container on one or more computing systems, the first media container comprising:
  - a first content location on a server, the first content location including first content data;
  - a first set of metadata describing the first content, the first metadata including a first content type of the content and a first hierarchy on a Z-axis describing a display priority;
- constructing a second media container, the second media container comprising:
  - a second content location on a server, the second content location including second content data;
  - a second set of metadata describing the second content, the second metadata including a second content type of the content and a second hierarchy on the Z-axis;
- constructing a third media container, the third media container comprising:
  - a first set of links to media containers, the set of links including a first link to the first media container and a second link to the second media container;
  - metadata describing a third hierarchy on the Z-axis;
- receiving a request by a display system to display the third media container in a volumetric environment using hierarchies on the Z-axis;
- determining, by the display system, the first set of links of the third media container includes the first link and the second link;
- selecting, by the display system, the first link for-preparing for display;
- selecting, by the display system, a first display panel configured to prepare for display the first media container based at least in part on the first set of metadata;
- providing the first content location to the first media panel;
- creating a first inter-panel thread for the first media panel to prepare for display the first content data to form first display data;
- selecting the second link for preparing for display;
- selecting a second media panel based at least in part on the second set of metadata;
- providing the second content location to the second media panel;
- creating a second inter-panel thread for the second panel to prepare for display the second content data to form second display data;
- selecting a third panel for display at runtime based at least in part on the first panel, second panel and third media container;
- receiving the first display data and the second display data;
- creating a third inter-panel thread for the third panel to prepare for display a combination of the first display data and the second display data to form third display data based at least in part on the third metadata and the first hierarchy on the Z-axis and the second hierarchy on the Z-axis.

16. The computer program product of claim 15, wherein receiving the request to display the third media container further comprises receiving the request from a web browser.

17. The computer program product of claim 15, wherein receiving the request to display the third media container further comprises receiving the request from an application server.

18. The computer program product of claim 15, wherein determining the first set of links of the third media container includes the first link and the second link further comprises determining, by the display engine, the first set of links of the third media container includes the first link and the second link.

* * * * *